United States Patent
Azuma et al.

(10) Patent No.: US 7,538,833 B2
(45) Date of Patent: May 26, 2009

(54) LIQUID CRYSTAL DISPLAY DEVICE

(75) Inventors: Yuji Azuma, Fujisawa (JP); Shiro Ueda, Chiba (JP); Shimon Itakura, Mobara (JP)

(73) Assignees: IPS Alpha Technology, Ltd., Mobara-shi (JP); Hitachi Displays Devices, Mobara-shi (JP)

( * ) Notice: Subject to any disclaimer, the term of this patent is extended or adjusted under 35 U.S.C. 154(b) by 0 days.

(21) Appl. No.: 12/037,954

(22) Filed: Feb. 27, 2008

(65) Prior Publication Data

US 2008/0204629 A1    Aug. 28, 2008

(30) Foreign Application Priority Data

Feb. 28, 2007    (JP) .............................. 2007-048251

(51) Int. Cl.
  *G02F 1/1335*  (2006.01)
  *H01R 33/02*   (2006.01)
  *F21S 4/00*    (2006.01)

(52) U.S. Cl. ........................... 349/61; 349/58; 362/225; 362/647; 362/396; 362/658; 439/235

(58) Field of Classification Search ................... 349/56, 349/58, 16; 362/225, 396, 647, 658; 439/235
See application file for complete search history.

(56) References Cited

U.S. PATENT DOCUMENTS 7,278,754 B2 * 10/2007 Kim et al. ................... 362/225

2008/0211988 A1 * 9/2008 Tsubokura et al. ............ 349/61

FOREIGN PATENT DOCUMENTS

JP    2005-347259    12/2005

* cited by examiner

*Primary Examiner*—Brian Healy
*Assistant Examiner*—Michael P Mooney
(74) *Attorney, Agent, or Firm*—Antonelli, Terry, Stout & Kraus, LLP.

(57) ABSTRACT

A subject of the present invention is to provide a liquid crystal display device in which the reliability of electrical connection between electrodes and electrode fittings can be improved even if there are variations in diameter of the bar light sources arranged in the back light. There is provided a liquid crystal display device comprising: a liquid crystal display panel; and a back light arranged on the back surface of the present liquid crystal display panel; wherein the back light is composed of a plurality of bar light sources arranged in parallel in a plane opposing the liquid crystal display panel and a base that supports each of the bar light sources through electrode fittings at electrode sections; wherein the electrode fittings are each provided with a pair of pressing portions which press the circumferential surface of the electrode of the bar light source from opposing sides of the circumferential surface; and wherein each of the pressing portions is arc-shaped such that the pressing portion surface facing the circumferential surface of the electrode of the bar light source has a concave; and is formed such that the pressing portion presses the electrode of the bar light source through projections formed on the concave.

9 Claims, 5 Drawing Sheets

LIQUID CRYSTAL DISPLAY DEVICE

CLAIM OF PRIORITY

The present application claims priority from Japanese Application JP 2007-048251 filed on Feb. 28, 2007, the content of which is hereby incorporated by reference into this application.

BACKGROUND OF THE INVENTION

1. Field of the Invention

The present invention relates to a liquid crystal display device and particularly to a liquid crystal display device including a so-called direct-type back light.

2. Description of the Related Art

With the increase in size of the liquid crystal display panel, the use of the direct-type liquid crystal display device is also increasing because this type enables the homogenization of a planar light source as a back light.

With such a back light, fluorescence tubes composed of a plurality of bar light sources are uniformly arranged in parallel in a plane opposing the liquid crystal display panel, each fluorescence tube being supported by a pair of electrode fittings on a chassis-shaped base having reflecting means on its inner surface.

The electrode fittings have a function to supply power to the fluorescence tubes, each of electrode fittings being composed of a bifurcated fitting member which presses, at an electrode section of the fluorescence tube, the electrode from opposing sides of the circumferential surface thereof.

A pressing portion of the electrode fitting against the electrode of the fluorescence tube is formed by an arc shape having a concave along the circumferential surface of the electrode.

A liquid crystal display device having such a configuration is disclosed, for example, in JP-A-2005-347259.

SUMMARY OF THE INVENTION

However, the electrode fittings disclosed in JP-A-2005-347259 are formed in the same shape and dimension for a plurality of fluorescence tubes. An inconvenience that fluorescence tubes having different diameters due to manufacturing variation are supported by a chassis-shaped base through these electrode fittings was thus not taken into consideration.

That is, the electrode fitting is preset so as to give an appropriate pressure to a fluorescence tube having a predetermined diameter; if there is an external electrode fluorescence tube not having the predetermined diameter, therefore, electrical connection of the electrode fittings may not reliably be ensured with the external electrode fluorescence tube.

As mentioned above, the pressing portion of the electrode fitting against the electrode of the fluorescence tube is formed in an arc shape having a concave along the circumferential surface of the electrode. If the fluorescence tube has a predetermined diameter, it is possible to press the electrode securing a large contact area thereof; otherwise, there arises an inconvenience that contact with the electrode is not sufficient.

An object of the present invention is to provide a liquid crystal display device in which the reliability of electrical connection can be improved between the electrode and the electrode fittings even if there are variations in diameter of the bar light sources arranged in the back light.

Of the pieces of the invention disclosed in the present application, outlines of representative ones will be briefly explained below.

(1) A liquid crystal display device according to the present invention comprises, for example, a liquid crystal display panel and a back light arranged on the back surface of the liquid crystal display panel.

The back light is composed of a plurality of bar light sources arranged in parallel in a plane opposing the liquid crystal display panel and a base that supports each of the bar light sources through electrode fittings at electrode sections.

The electrode fittings are provided with a pair of pressing portions which press the circumferential surface of the electrode of the bar light source from opposing sides of the circumferential surface.

Each of the pressing portions is arc-shaped such that the pressing portion surface facing the circumferential surface of the electrode of the bar light source has a concave; and is formed such that the pressing portion presses the electrode of the bar light source through projections formed on the concave.

(2) The liquid crystal display device according to the present invention is premised, for example, on the configuration of (1), wherein the projections are formed on the concave of the pressing portion such that they are extended in a direction perpendicularly intersecting with the circumferential direction of the concave.

(3) The liquid crystal display device according to the present invention is premised, for example, on the configuration of (1), wherein a plurality of the projections are circumferentially formed on the concave of the pressing portion.

(4) The liquid crystal display device according to the present invention is premised, for example, on the configuration of (1), wherein a plurality of the electrode fittings are arranged side by side along the longitudinal direction of the bar light source for each electrode of each bar light source.

(5) The liquid crystal display device according to the present invention is premised, for example, on the configuration of (4), wherein each of the electrode fittings arranged side by side along the longitudinal direction of the bar light source for each electrode of each bar light source is provided with a plurality of projections circumferentially formed on the concave of the pressing portion; and wherein, with respect to projections formed on one of the electrode fittings, projections formed on the other electrode fittings are circumferentially shifted.

The present invention is not limited to the above-mentioned configurations but can be modified in diverse ways without departing from the spirit and scope thereof.

In accordance with such a liquid crystal display device, it is possible to improve the reliability of electrical connection between the electrode and the electrode fittings even if there are variations in diameter of the bar light sources arranged in the back light.

DETAILED DESCRIPTION OF THE PREFERRED EMBODIMENTS

Embodiments of a liquid crystal display device according to the present invention will be explained below with reference to the accompanying drawings.

Figure 2:
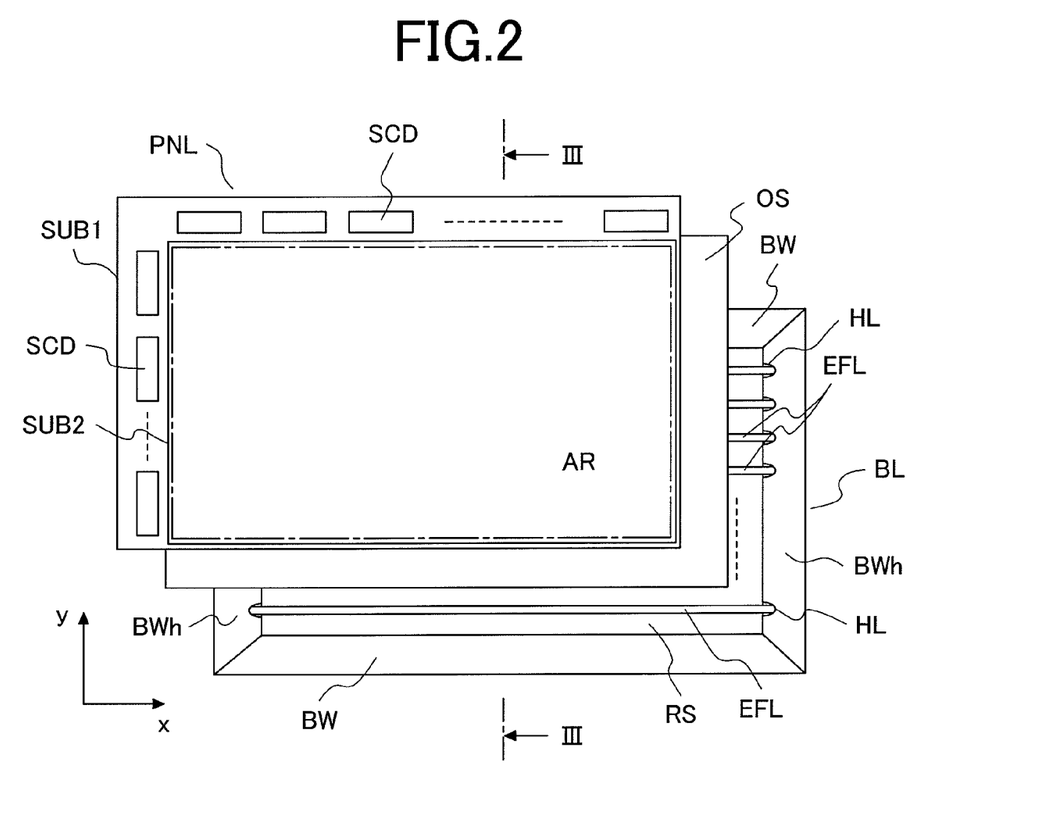
FIG. 2 is a schematic configuration diagram of an embodiment of the liquid crystal display device according to the present invention.

FIG. 2 is a schematic configuration diagram of an embodiment of the liquid crystal display device according to the present invention.

A liquid crystal display panel PNL, an optical sheet OS, and a back light BL are arranged in this order from the observer side.

The liquid crystal display panel PNL is composed of a package, i.e., a pair of substrates SUB1 and SUB2, for example, made of glass arranged in parallel, and liquid crystal is disposed between the substrates SUB1 and SUB2.

Pixels (not shown) arranged in matrix form are formed on the liquid-crystal-side surfaces of the substrates SUB1 and SUB2 with the liquid crystal included as one of their components so as to control the light transmission of the liquid crystal at each pixel.

An area in which these pixels are formed is referred to as liquid crystal display area AR (area surrounded by dashed lines in FIG. 2). The entire area of the liquid crystal display area AR is irradiated with the light emitted from the back light BL (to be mentioned later). The observer recognizes an image through the light that penetrates each pixel.

The substrate SUB1 arranged rearward with respect to the observer is made larger than the substrate SUB2 in area. Semiconductor devices SCD each composed of a circuit for independently driving each pixel are provided on the periphery of the substrate SUB1 exposed from the substrate SUB2.

On the back surface of the liquid crystal display panel PNL, a back light BL is arranged through, for example, a diffusion sheet, a prism sheet, or an optical sheet OS with a laminated structure of these sheets. The optical sheet OS is designed to diffuse or condense the light from the back light BL to lead it to the side of the liquid crystal display panel PNL.

The back light BL, a so-called direct-type back light, comprises a bottom frame (shown as BS in FIGS. 3 and 4) in a plane in parallel with the liquid crystal display panel PNL. The bottom frame is composed of a base that supports, for example, a plurality of external electrode fluorescence tubes EFL arranged in parallel in the y direction of FIG. 2, with their longitudinal directions matched to the x direction of FIG. 2. The bottom frame BS is composed, for example, of a box-shaped metal. Further, a reflecting sheet RS having side wall surfaces BW is provided on the surface of the bottom frame BS, the side wall surfaces BW being obliquely arranged by bending each of the x-direction edges. Further, the bottom frame BS is provided with side wall plates BWh made, for example, of a resin material and having an optical reflective function in a plane on the side of the liquid crystal display panel PNL, the side wall plates BWh being obliquely arranged at each edge in the y direction of FIG. 2. The side wall plates BWh, together with the side wall surfaces BW of the reflecting sheet RS, substantially form the side walls of the back light BL. The configuration of the back light BL will be mentioned later in more detail.

Figure 3:
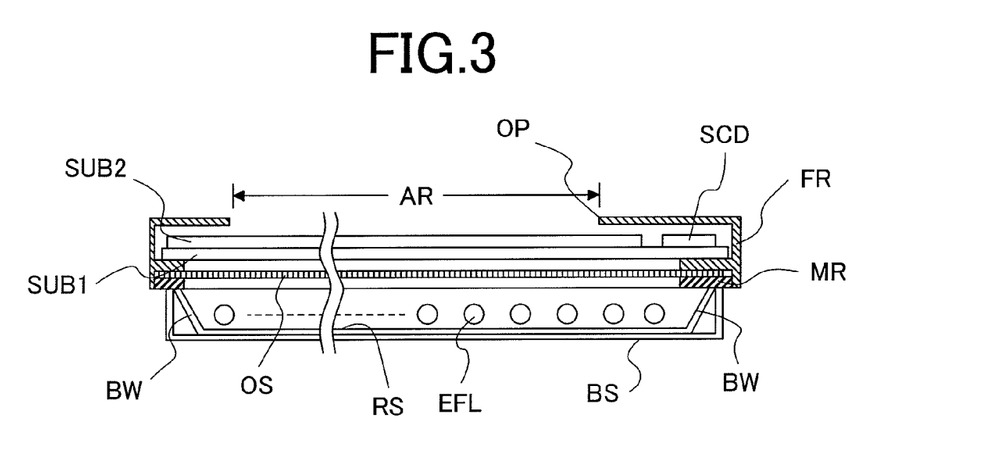
FIG. 3 is a cross-sectional view showing a modular liquid crystal display device.

Further, the liquid crystal display panel PNL, the optical sheet OS, and the back light BL are stored in a top frame FR and an intermediate frame MR, as shown in FIG. 3, so as to be formed as a modular liquid crystal display device. FIG. 3 is a cross-sectional view of the modular liquid crystal display device, which is equivalent to a cross section taken along the III-III line of FIG. 2. The top frame FR is provided with at least an opening OP for exposing the liquid crystal display area AR of the liquid crystal display panel PNL on the observer side and stores the liquid crystal display panel PNL, the optical sheet OS, and the back light BL which are positioned with sufficient accuracy. Although the semiconductor devices SCD are formed on the substrate SUB1 with the present embodiment, they may be formed on a flexible substrate. In that case, it is possible to fold the semiconductor devices SCD in the vertical direction of FIG. 3, allowing the size reduction of the frame.

Figure 4A:
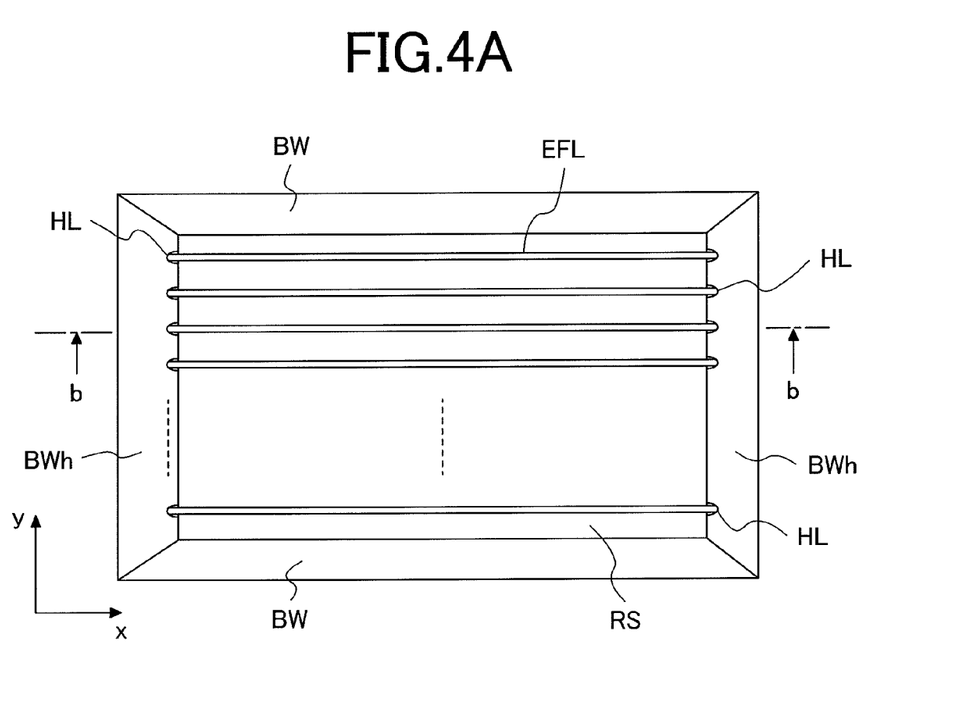
FIGS. 4A and 4B are configuration diagrams of an embodiment of a back light of the liquid crystal display device according to the present invention.
Figure 4B:
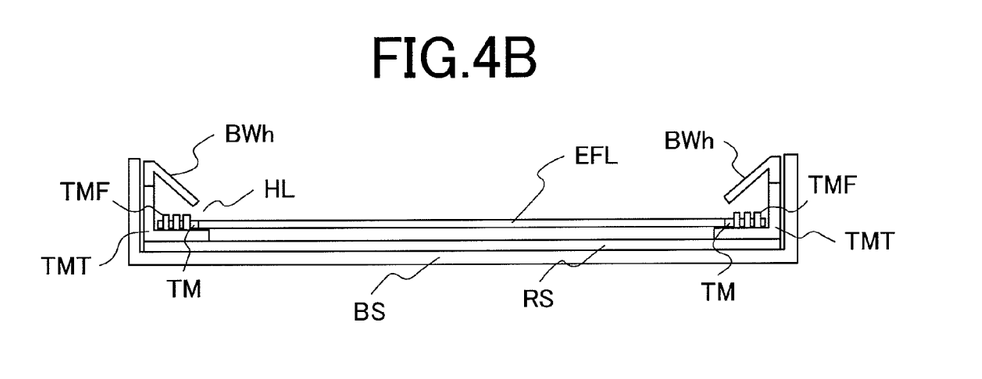

FIG. 4A is a plan view showing only the back light BL, and FIG. 4B is a cross-sectional view taken along the b-b line of FIG. 4A.

The side wall plates BWh are attached to the bottom frame BS through electrode support bases TMT (to be mentioned later) made, for example, of a resin material. Further, each of the side wall plates BWh is provided with a plurality of holes HL arranged side by side on the edge on the bottom-frame-BS side such that electrodes TM formed at each end of an external electrode fluorescence tube EFL arranged through the hole HL are positioned on the back surface side of the side wall plates BWh.

Each electrode TM of the external electrode fluorescence tube EFL is sandwiched by (engaged to) electrode fittings TMF arranged on each of the electrode support bases TMT. Thereby, each external electrode fluorescence tube EFL is supported by the bottom frame BS through the electrode fittings TMF, and power is supplied through the electrode fittings TMF.

Figure 5:
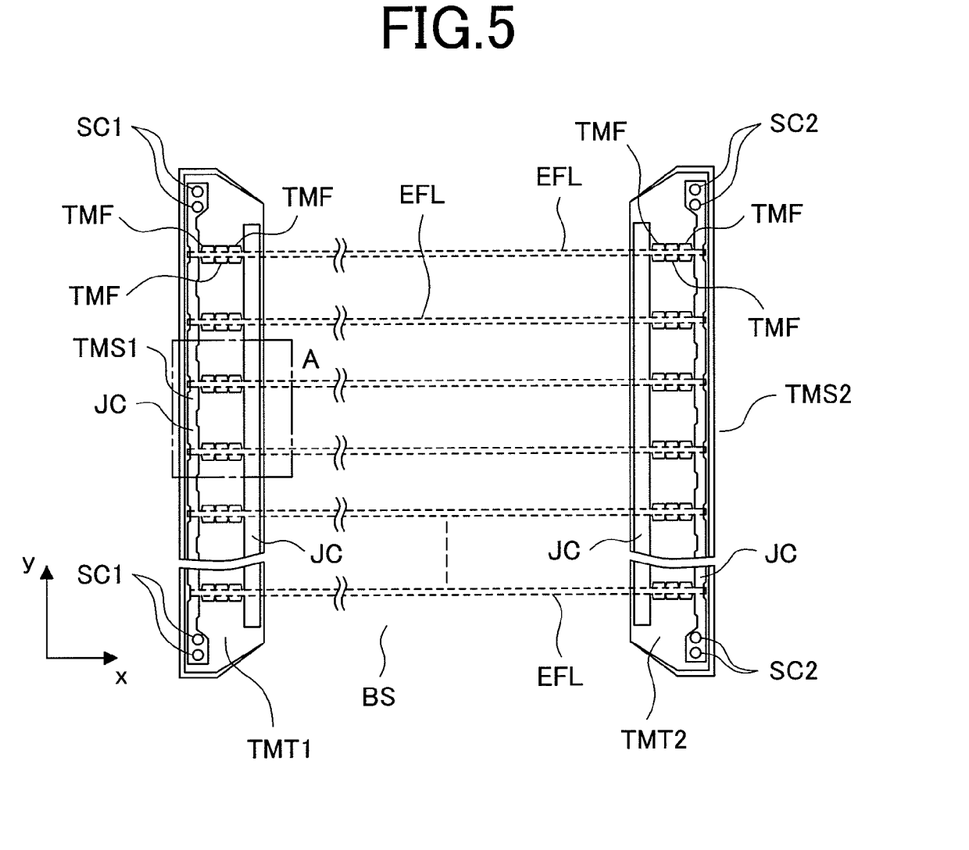
FIG. 5 is a configuration diagram of an embodiment of an electrode support member of the liquid crystal display device according to the present invention.

The electrode fittings TMF are integrally formed with electrode support members TMS1 and TMS2 made of the same metal arranged on each end side of each external electrode fluorescence tube EFL. FIG. 5 is a plan view showing the electrode support members TMS1 and TMS2 which are arranged on their respective electrode support bases TMT (shown as TMT1 and TMT2).

Referring to FIG. 5, one electrode support member TMS1 is arranged on the left-hand side of areas where the external electrode fluorescence tubes EFL (shown by dotted lines) are arranged, and the other electrode support member TMS2 is arranged on the right-hand side of the areas, each TMS being extended in the y direction. Specifically, the electrode support member TMS1 commonly supports the electrode TM sections at the left end of each external electrode fluorescence tube EFL, and the electrode support member TMS2 commonly supports the electrode TM sections at the right end of each external electrode fluorescence tube EFL.

Further, with the electrode support member TMS1, for example, three electrode fittings TMF arranged along the longitudinal direction of each electrode TM on the left-hand side of each external electrode fluorescence tube EFL sandwich the electrode TM, thereby supporting each of the external electrode fluorescence tubes EFL. Likewise, with the electrode support member TMS2, for example, three electrode fittings TMF arranged along the longitudinal direction of each electrode TM on the right-hand side of each external electrode fluorescence tube EFL sandwich the electrode TM, thereby supporting each of the external electrode fluorescence tubes EFL. Even if at least one electrical contact of the electrode fittings TMF is not sufficient, this configuration ensures electrical contacts by the remaining electrode fittings TMF.

Thus, the electrode support members TMS1 and TMS2 are configured such that, between a pair of junctions JC extending opposite to each other, groups of electrode fittings are supported with them being arranged in parallel in the extending direction of the junctions JC, each group of electrode fittings being composed of a plurality of electrode fittings TMF arranged side by side in a direction perpendicularly intersecting with the junctions JC.

These electrode support members TMS1 and TMS2 are formed, for example, by press working of a plate material.

Further, the electrode support member TMS1 is fixed to the electrode support base TMT1 with screws SC1, for example, at both ends of the electrode support member; the electrode support member TMS2 is fixed to the electrode support base TMT2 with screws SC2, for example, at both ends of the electrode support member.

Figures 1A, 1B:
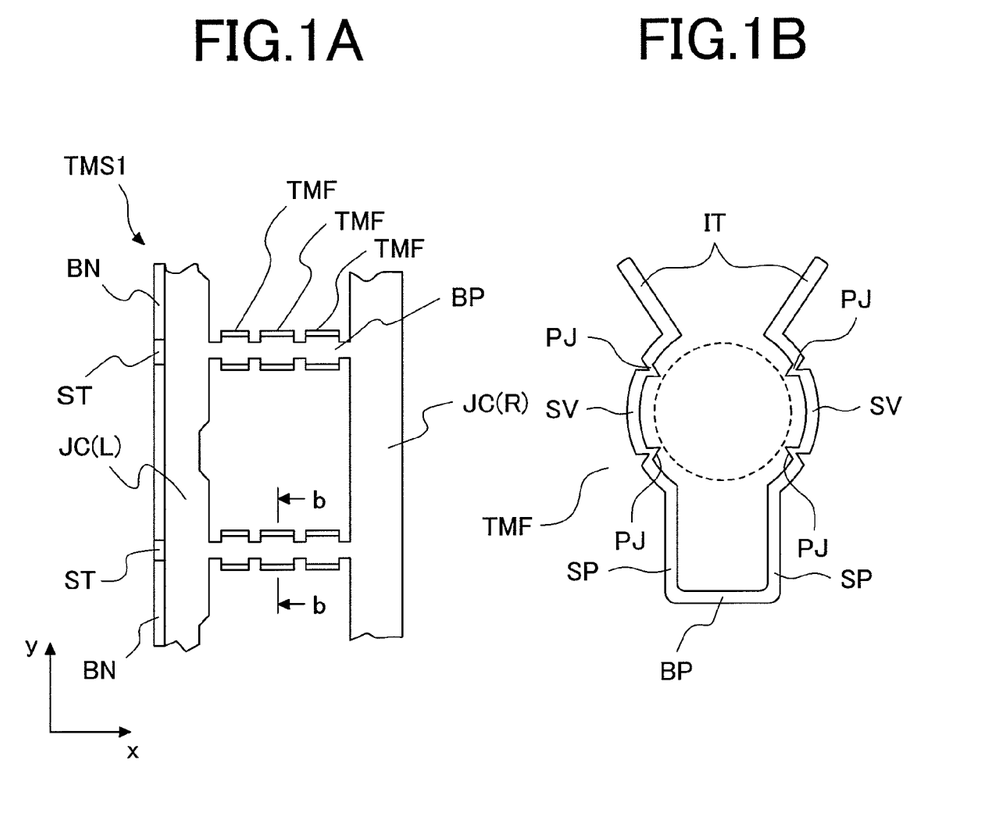
FIGS. 1A and 1B are configuration diagrams of essential parts of an embodiment of a liquid crystal display device according to the present invention.

FIG. 1A is an enlarged view of the electrode support member TMS1 surrounded by a dotted-line frame A of FIG. 5. Referring to FIG. 1A, the electrode support member TMS1 includes a base portion BP commonly fixing three electrode fittings TMF arranged side by side; and a left-hand side junction JC(L) and a right-hand side junction JC(R) which are commonly connected with base portions BP on each end side thereof. These base portions BP and the junctions JC(L) and JC(R) form a ladder pattern when observed in 2-dimensional manner.

FIG. 1B is a cross-sectional view taken along the b-b line of FIG. 1A illustrating the electrode fitting TMF. The electrode fitting TMF has a bifurcated structure having a pair of tongue pieces opposed to each other which sandwich an electrode TM of an external electrode fluorescence tube EFL from both sides.

Specifically, the electrode fitting TMF is provided with a pair of support portions SP formed, for example, by perpendicularly bending the sides of the base portion BP of the electrode support member TMS1, each of the support portions SP being provided with a pressing portion SV which presses the electrode TM of the external electrode fluorescence tube EFL from opposing sides of the circumferential surface of the electrode (shown by a dotted circle in FIG. 1B).

Figure 6A:
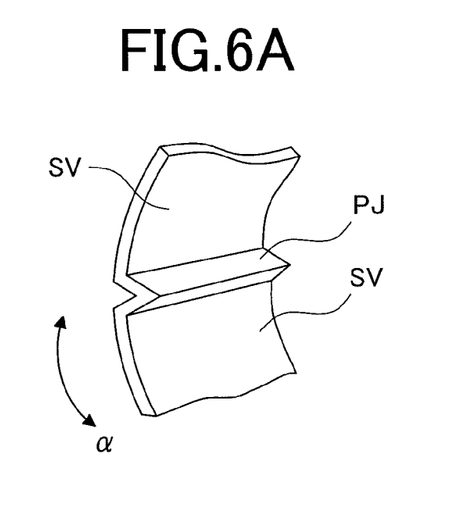
FIGS. 6A and 6B are configuration diagrams showing details of a projection formed on an electrode fitting.

Each of these pressing portions SV is formed in an arc shape having a concave on the side of the circumferential surface (shown by a dotted circle) of the electrode TM of the external electrode fluorescence tube EFL. Projections PJ are formed on the concave, i.e., the surface on the side of the electrode TM of the external electrode fluorescence tube EFL. Each projection PJ having an inverted-V-shaped cross section is formed such that it is extended in a direction perpendicularly intersecting with the circumferential direction a of the concave, as shown in FIG. 6A. By thus forming the projection PJ in an extended manner, it is possible to increase the contact area of the top portion of the projection PJ with the electrode TM of the external electrode fluorescence tube EFL. Further, one pressing portion SV is provided with, for example, two projections PJ formed on the concave, and the other pressing portion SV is also provided with, for example, two projections PJ. Forming a plurality of projections PJ along the circumferential direction a of the concave of the pressing portion SV enables to increase the number of contact portions of the tips of the projections PJ with the electrode TM of the external electrode fluorescence tube EFL.

Thus, it is possible to form the electrode fitting TMF so as to press the circumferential surface of the electrode TM of the external electrode fluorescence tube EFL through the projections PJ formed on the concaves at the pressing portions SV. In this case, it is possible to ensure a reliable electrical connection between the electrode TM and the electrode fitting TMF according to the height of the projection PJ even if there are variations in diameter of the electrode TM of the external electrode fluorescence tube EFL.

Further, the electrode fitting TMF is provided with introductory portions IT radially spreading from the ends of the support portions SP. The introductory portions IT are formed in order to smoothly introduce the external electrode fluorescence tube EFL into the support portions SP.

Figure 6B:
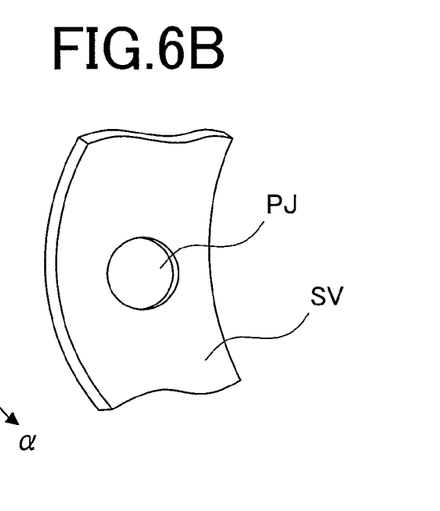

With the above-mentioned embodiment, the projection PJ has an inverted-V-shaped cross section. However, the cross section is not limited thereto but may be, for example, semicircle-shaped. Further, it is not necessary that the projection PJ is extended in a direction perpendicularly intersecting with the circumferential direction α of the concave. For example, it is also possible, of course, to form a hemispherical projection PJ almost at the central portion in a direction perpendicularly intersecting with the circumferential direction α of the concave, as shown in FIG. 6B. The above-mentioned effects can be obtained by projections in either of the shapes.

Figure 7A:
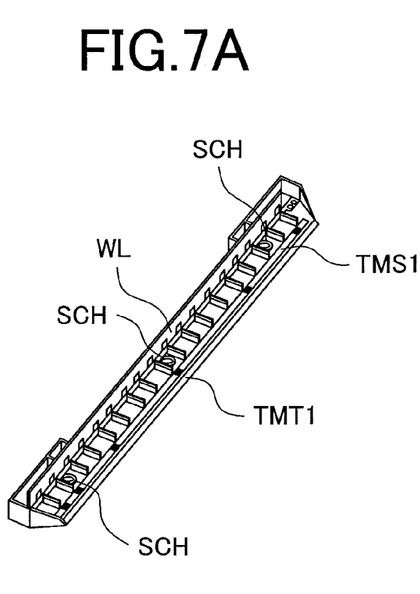
FIGS. 7A and 7B are perspective views respectively showing an electrode support base and a side wall plate of the liquid crystal display device according to the present invention.
Figure 7B:
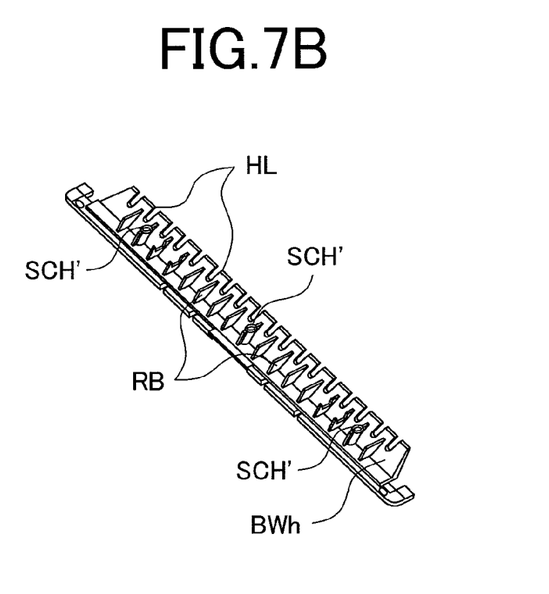

FIG. 7A is a perspective view of an electrode support base TMT1 on which the above-mentioned electrode support member TMS1 is arranged. FIG. 7B is a perspective view of a side wall plate BWh which is (temporarily) fixed such that it covers the electrode support base TMT1.

FIG. 7B shows a state of the side wall plate BWh when viewed from the back side of the surface on the side of the liquid crystal display panel PNL. A plurality of ribs RB extending in the shorter-side direction of the side wall plate and placed intermittently in the longer-side direction thereof are formed integrally therewith. The ribs RB are formed in order to improve the mechanical strength against deformation of the side wall plate BWh.

From the state shown in FIG. 7B, the thus-configured side wall plate BWh is reversed, laterally inverted, and then placed on the electrode support base TMT1 shown in FIG. 7A so as to be (temporarily) fixed to the electrode support base TMT1.

Further, the electrode support base TMT1 is provided with screw holes SCH formed side by side in its longitudinal direction, and the side wall plate BWh is also provided with screw holes SCH' corresponding to the respective screw holes SCH. The central axes of the screw holes SCH and SCH' are in agreement when the side wall plate BWh is temporarily fixed to the electrode support base TMT1. The electrode support base TMT1 and the side wall plate BWh temporarily fixed in this manner are then fixed to the bottom frame BS with screws (not shown) screwed into the bottom frame BS through the screw holes SCH and SCH'.

With the above-mentioned embodiment, only the fact that projections PJ are formed at the pressing portions SV of each metal fitting TMF has been explained. The relation of each projection PJ formed on each of three metal fittings TMF which commonly press one electrode TM of the external electrode fluorescence tube EFL was not shown. However, the metal fittings TMF may be configured as shown in FIG. 8, for example.

Figure 8:
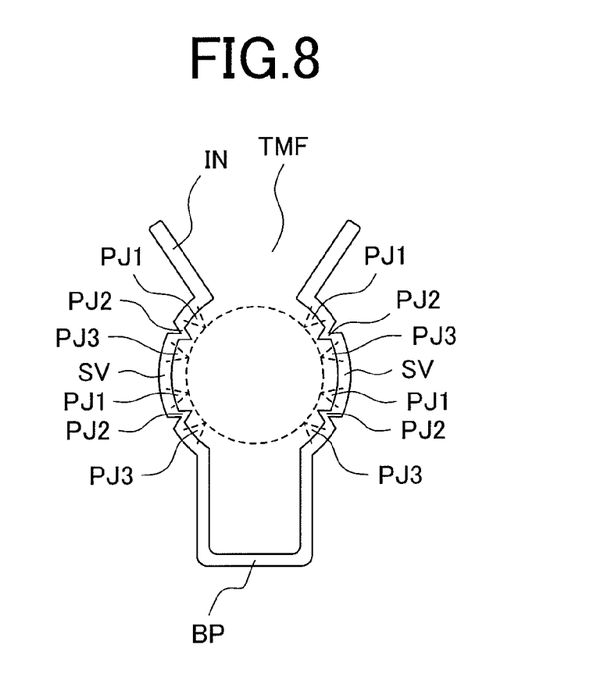
FIG. 8 is a configuration diagram of essential parts of another embodiment of the liquid crystal display device according to the present invention.

FIG. 8 is a diagram showing in an overlapped manner three metal fittings TMF which commonly press one electrode TM of the external electrode fluorescence tube EFL when viewed from the central-axis direction thereof.

Of the three metal fittings TMF, the metal fitting TMF positioned in the middle and the projections thereof (shown as PJ2) are drawn with solid lines, and the projections of the metal fitting TMF posteriorly positioned on the paper (shown as PJ1) and the projections of the metal fitting TMF anteriorly positioned on the paper (shown as PJ3) are drawn with dotted lines.

As shown in FIG. 8, the projections PJ2 of the electrode fitting TMF shown in FIG. 8 are circumferentially shifted with respect to the projections PJ1 of the electrode fitting TMF positioned posteriorly on the paper. Further, the projections PJ3 of the electrode fitting TMF positioned anteriorly on the paper are circumferentially shifted with respect to the projections PJ2 of the electrode fitting TMF shown in FIG. 8.

With the above-mentioned configuration, it is possible to ensure a reliable electrical connection even if there arises a longitudinal deformation of the diameter of the electrode TM, supported by the three metal fittings TMF, of the external electrode fluorescence tube EFL.

Each of the above embodiments can be used independently or in combination because the effects of each embodiment can be obtained in an independent or synergetic manner.

What is claimed is:

1. A liquid crystal display device comprising:
   a liquid crystal display panel; and
   a back light arranged on the back surface of the present liquid crystal display panel;
   wherein the back light is composed of a plurality of bar light sources arranged in parallel in a plane opposing the liquid crystal display panel and a base that supports each of the bar light sources through an electrode fitting at an electrode section;
   wherein the electrode fitting is provided with a pair of pressing portions which press the circumferential surface of the electrode of the bar light source from opposing sides of the circumferential surface; and
   wherein each of the pressing portions is arc-shaped such that the pressing portion surface facing the circumferential surface of the electrode of the bar light source has a concave; and is formed such that the pressing portion presses the electrode of the bar light source through a projection formed on the concave.

2. The liquid crystal display device according to claim 1, wherein:
   the projection is formed on the concave of the pressing portion such that it is extended in a direction perpendicularly intersecting with the circumferential direction of the concave.

3. The liquid crystal display device according to claim 1, wherein:
   a plurality of the projections are circumferentially formed on the concave of the pressing portion.

4. The liquid crystal display device according to claim 1, wherein:
   the cross section of the projection is inverted-V-shaped.

5. The liquid crystal display device according to claim 1, wherein:
   the projection is spherical.

6. A liquid crystal display device comprising:
   a liquid crystal display panel; and
   a back light arranged on the back surface of the present liquid crystal display panel;
   wherein the back light is composed of a plurality of bar light sources arranged in parallel in a plane opposing the liquid crystal display panel and a base that supports each of the bar light sources through an electrode fitting at an electrode section;
   wherein the electrode fitting is provided with a pair of pressing portions which press the circumferential surface of the electrode of the bar light source from opposing sides of the circumferential surface;
   wherein each of the pressing portions is arc-shaped such that the pressing portion surface facing the circumferential surface of the electrode of the bar light source has a concave; and is formed such that the pressing portion presses the electrode of the bar light source through a projection formed on the concave; and
   wherein a plurality of the electrode fittings are arranged side by side along the longitudinal direction of the bar light source for each electrode of each bar light source.

7. The liquid crystal display device according to claim 6, wherein each of the electrode fittings arranged side by side along the longitudinal direction of the bar light source for each electrode of each bar light source is provided with a plurality of projections circumferentially formed on the concave of the pressing portion; and
   wherein, with respect to projections formed on one of the electrode fittings, projections formed on the other electrode fittings are circumferentially shifted.

8. The liquid crystal display device according to claim 6, wherein:
   the cross section of the projection is inverted-V-shaped.

9. The liquid crystal display device according to claim 6, wherein:
   the projection is spherical.

* * * * *

UNITED STATES PATENT AND TRADEMARK OFFICE
CERTIFICATE OF CORRECTION

PATENT NO. : 7,538,833 B2  Page 1 of 1
APPLICATION NO. : 12/037954
DATED : May 26, 2009
INVENTOR(S) : Azuma et al.

It is certified that error appears in the above-identified patent and that said Letters Patent is hereby corrected as shown below:

On the title page item (73), should read:
-- IPS Alpha Technology, Ltd., Mobara-shi (JP)
   Hitachi Display Devices, Ltd., Mobara-shi (JP) --

Signed and Sealed this

Ninth Day of February, 2010

David J. Kappos
*Director of the United States Patent and Trademark Office*